Aug. 18, 1931.  C. C. WHITTAKER  1,819,141
WATER RHEOSTAT
Filed April 30, 1927   2 Sheets-Sheet 1

WITNESSES:
Fred C. Wilharm
Birney Hines

INVENTOR
Charles C. Whittaker
BY
Wesley G. Carr
ATTORNEY

Aug. 18, 1931. C. C. WHITTAKER 1,819,141
WATER RHEOSTAT
Filed April 30, 1927 2 Sheets-Sheet 2
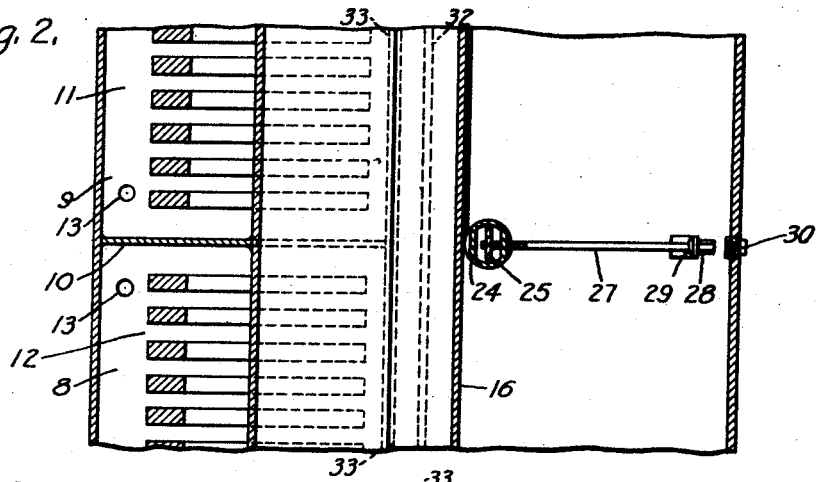
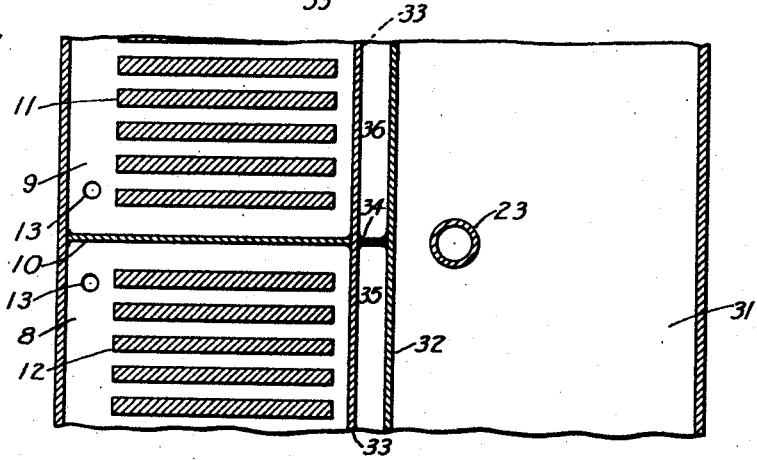
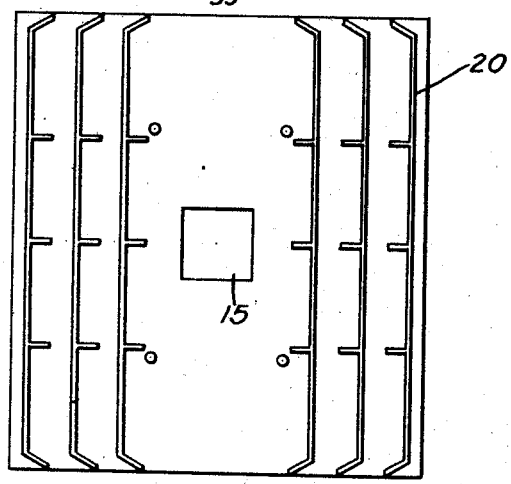
INVENTOR
Charles C. Whittaker Patented Aug. 18, 1931

1,819,141

UNITED STATES PATENT OFFICE

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA

WATER RHEOSTAT

Application filed April 30, 1927. Serial No. 187,760.

My invention relates to liquid rheostats and more particularly to the means employed for cooling the electrolyte in such rheostats.

The object of my invention, generally stated, is the provision of a liquid rheostat and means for circulating and cooling the electrolyte employed therein that shall be simple and efficient in operation and capable of being readily and economically manufactured.

Another object of the invention is to provide for the circulating of the electrolyte through a cooling chamber and the proper distribution of it to a plurality of electrode-containing tanks in which electrodes are mounted.

It is also an object of the invention to provide for the dividing of a circulating stream of electrolyte flowing in a rheostat and varying the volume of electrolyte delivered from each part of the main stream.

Other objects of the invention will, in part, be obvious and will, in part appear hereinafter.

The invention accordingly is disclosed in the embodiment thereof shown in the accompanying drawings and comprises the structural features and combination of elements and arrangements of parts which will be exemplified in the construction hereinafter set forth and the scope of the application of which will be indicated in the claims.

For a fuller understanding of the invention, reference may be had to the following detailed description taken in connection with the accompanying drawings, in which:

Fig. 2 is a view, in section, taken along the line II—II, of Fig. 1;

Fig. 3 is a view, in section, taken along the line III—III of Fig. 1; and,

Fig. 4 is a top plan view of one of the cooling trays illustrated in Fig. 1.

Figure 1:
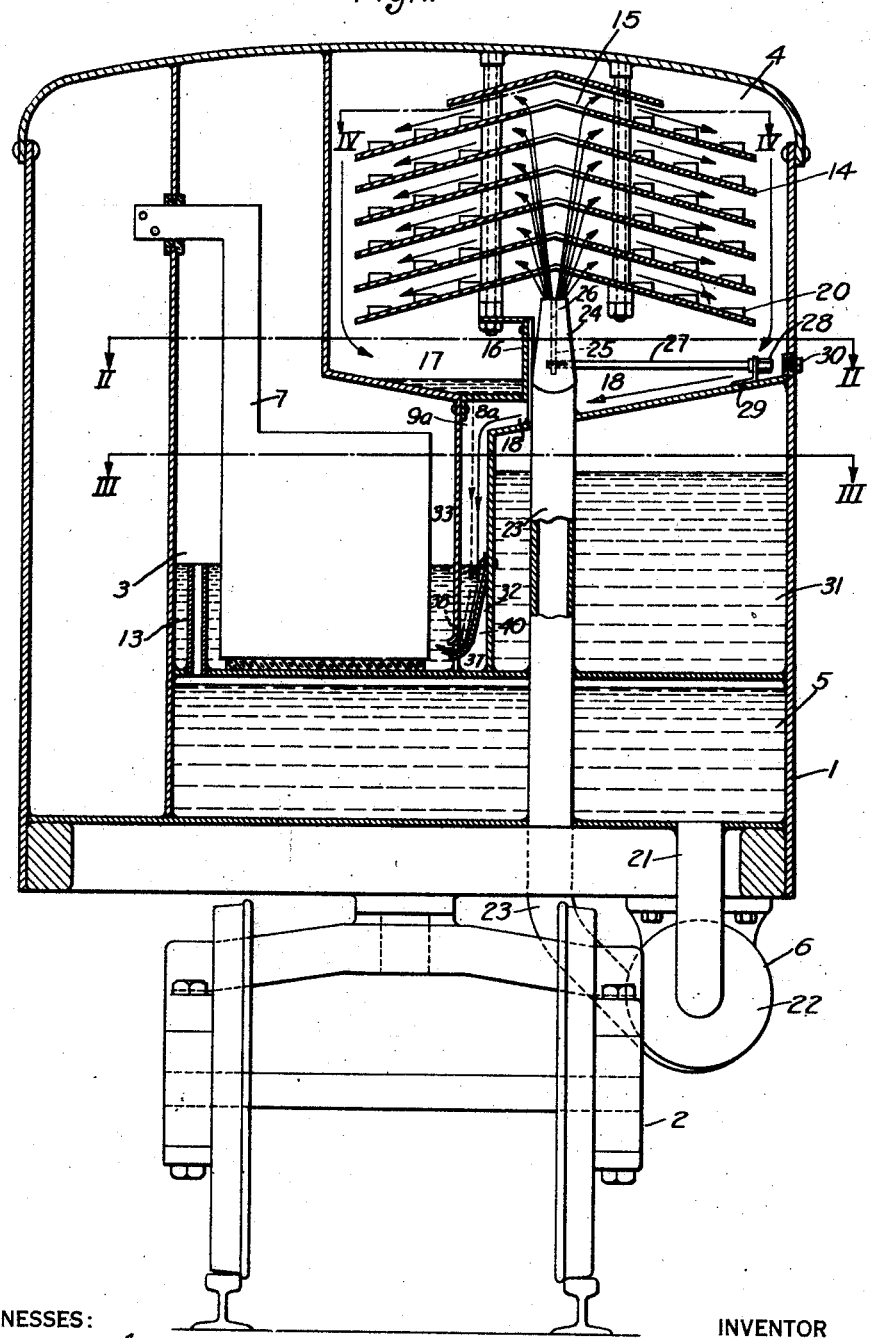
Figure 1 is a view, partly in end elevation and partly in section, of an electric locomotive embodying one form of my invention.

In the drawings, I have illustrated my improvement in liquid rheostats as installed in an electric locomotive cab, which is carried by a truck 2. The rheostat comprises, in general, an electrode-containing tank 3, a cooling tower 4 in which the electrolyte may be cooled, an electrolyte reservoir 5 that is disposed below the other portions of the liquid rheostat, and a circulating system 6 for the electrolyte.

The electrode containing tank 3 is divided into two compartments or tanks 8 and 9 by means of a middle partition 10. A plurality of electrodes 11 are located in the compartment or tank 9 and are disposed to be connected in circuit with a motor (not shown) while a similar number of electrodes 12 are located in the compartment 8 and are connected in circuit with another motor (not shown). Each of the compartments 8 and 9 of the electrode-containing tank is provided with an overflow outlet 13 which conveys surplus electrolyte to the reservoir 5.

In order to cool the electrolyte, cooling trays are mounted in the cooling tower 4. As shown, the series of cooling trays 14 are inclined downwardly from their center line and are arranged one above another. The trays are also provided with central openings 15 that register with each other and thus provide a central opening, through which electrolyte may be sprayed into the trays.

The floor of the compartment comprising the cooling tower 4 is divided by a partition 16 into two basins 17 and 18. Since the partition extends parallel to the center line of the trays 14, the electrolyte that flows over one half of the trays will be collected in basin 17 and that which flows over the other half will be collected in basin 18.

When a rheostat provided with a cooling tower embodying cooling trays is employed in an electric locomotive that travels over graded tracks and around curves, the cooling trays will be tilted and there is a tendency for the electrolyte that flows over them to spread unevenly over their inclined upper surfaces. In order to insure an even distribution of the electrolyte over the surfaces of the trays under all conditions, a number of transverse and horizontal slats or projections 20 have been provided on their upper surfaces to direct the flow of electrolyte and also to catch part of the electrolyte and keep the surfaces of the trays covered as long as possible.

The circulating system 6 comprises a pipe 21 that leads from the electrolyte reservoir 5 to a motor-driven pump 22, which is provided to draw electrolyte from the reservoir 5 and force it into the cooling tower 4 through a pipe 23. The upper end of the pipe 23 is provided with a nozzle 24 by means of which the electrolyte is sprayed through the central opening 15 in thes cooling trays. A flow splitter 25 is located in the nozzle 24 and is adapted to divide the spray or stream of electrolyte between the two inclined sections of the cooling trays in the cooling tower.

The flow splitter 25 is T-shaped and it is disposed in such manner that the head engages in slots 26 provided in the end of the nozzle 24 and with its body portion extending downwardly toward the base of the nozzle. The lower portion of the flow splitter 25 is adjustably mounted on one end of a screw-threaded rod 27. As shown, the rod 27 is provided with a circumferentially grooved head 28 which is rotatably mounted in a bifurcated bracket 29 that is carried by the floor of the cooling tower compartment and disposed near the outer wall thereof.

A removable plug 30 is located in the wall of the cooling tower compartment at a point opposite the adjusting head 28, and it may be removed to permit the insertion of a socket wrench to engage the head 28 to rotate the rod 27. Since the lower portion of the flow splitter 25 is in threaded engagement with the rod 27, it may be adjusted to any position to divide the electrolyte stream as it flows into the cooling tower.

The rheostat is also provided with a reserve electrolyte tank 31 for holding an additional supply of electrolyte.

In order to provide for the transfer of electrolyte from the cooling tower to the electrode tanks, the latter are disposed in a predetermined distance from the reserve tank 31, thus forming a communication chamber which is divided into two passageways 35 and 36 by a partition 34. The passageways 35 and 36 communicate with the basins 18 and 17 of the cooling tower respectively. As shown, the passageways 35 and 36 communicate with the electrode compartments 8 and 9 through openings 37 and 38 respectively.

A baffle plate 40 is located in the lower part of each of the passageways 35 and 36 for guiding the flow of electrolyte into each of the electrode-containing compartments 8 and 9.

In operating the apparatus described, a sufficient supply of electrolyte is first introduced into the reservoir 5 and then the motor pump 22 is started to circulate the electrolyte. As will be observed, the electrolyte will flow through the pipe 21, one motor pump 22, pipe 23, and nozzle 24 which directs it in two columns into the cooling tower, where one column falls over one portion of the cooling trays and the other column falls over the other portion of the cooling trays. The column falling over the one portion of the cooling trays flows down into the basin 18 of the cooling tower and passes out into the passageway 35 from whence it flows through the opening 37 into the electrode-containing compartment 8, and the other column falls over the other portion of the cooling trays and flows down into the basin 17 of the cooling tower and from thence into the passageway 36 and out through the opening 38 into the electrode-containing compartment 9.

When the apparatus is in operation, it may be found that the splitter does not divide the electrolyte stream into columns of the desired proportions.

When the motors connected to the electrodes are similar and operating under the same conditions an unequal distribution of the electrolyte affects the functioning of the electrodes in the electrode-containing compartments 8 and 9 and causes an unbalance of the motors.

In order to adjust the splitter to give the desired columns of electrolyte, which, in this case, are equal columns, the plug 30 may be removed and the splitter adjusted. A socket wrench may be utilized to turn the adjusting rod 27 and it is shaped to be inserted through the opening 30 to engage the head 28 to turn it either clockwise or counter-clockwise until the splitter 25 is in a position where it will cause an equal amount of electrolyte to be delivered to each portion of the cooling tower and thus to each electrode-containing compartment.

While the illustrated example constitutes a particular embodiment of my invention, I do not limit myself strictly to the details shown, since, manifestly, the same may be considerably broadened without departing from the spirit of the invention as disclosed in the appended claims.

I claim as my invention:

1. In a liquid rheostat, the combination with a cooling tower, an electrode-containing tank communicating with one section of the cooling tower and a second electrode-containing tank communicating with another section of the tower, of a circulating system and a nozzle for delivering electrolyte to the cooling tower, and a flow splitter located in the nozzle for distributing the electrolyte between the sections of the cooling tower.

2. In a liquid rheostat, the combination with a cooling tower, an electrode-containing tank communicating with one section of the cooling tower, a second electrode-containing tank communicating with another section of the tower, of a circulating system and a nozzle for delivering electrolyte to the cooling tower, and an adjustable flow splitter located in the nozzle for distributing an equal quantity of electrolyte to each section of the cooling tower.

3. In a liquid rheostat, the combination with a cooling tower, an electrode-containing tank communicating with one section of the cooling tower, and a second electrode-containing tank communicating with another section of the cooling tower, of a circulating system and a nozzle for delivering electrolyte to the tower, an adjustable flow splitter located in the nozzle, and means for locking the flow splitter in the position to which it is adjusted.

4. In a liquid rheostat, the combination with a cooling tower, an electrode-containing tank communicating with one section of the cooling tower, a second electrode-containing tank communicating with another section of the cooling tower, of a circulating system and a nozzle for delivering electrolyte to the tower, a flow splitter located in the nozzle and having one portion affixed to the inner wall thereof, and a bolt and nut for adjusting and locking the other portion of the flow splitter in any desired position.

5. In a liquid rheostat, the combination with a plurality of electrode-containing tanks, and a cooling tower comprising a casing and two separate sets of inclined trays located therein with their elevated edges adjacent to each other and having a centrally located opening therein, of a nozzle adapted to direct an electrolyte upwardly through said opening and distribute it to the two sets of trays.

6. In a liquid rheostat, the combination with a pair of electrode-containing tanks and a cooling tower provided with two separate sets of cooling trays, of means including a single discharge pipe for circulating an electrolyte through the cooling tower, and adjustable means provided in said discharge pipe for controlling the relative amounts of electrolyte delivered to the separate trays of the cooling tower.

In testimony whereof, I have hereunto subscribed my name this 26th day of April, 1927.

CHARLES C. WHITTAKER.